Figure 1:
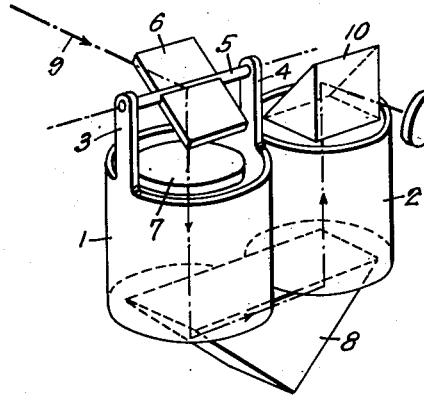

Jan. 20, 1953  R. HAYWARD  2,625,853
PANORAMIC TELESCOPE DEVICE
Filed Feb. 3, 1948  11 Sheets-Sheet 1

Inventor
Roger Hayward
By G.J. Kessenich, J.H. Church + A.W. Dew
Attorneys

Jan. 20, 1953   R. HAYWARD   2,625,853
PANORAMIC TELESCOPE DEVICE
Filed Feb. 3, 1948   11 Sheets-Sheet 2

Inventor
Roger Hayward

Jan. 20, 1953   R. HAYWARD   2,625,853
PANORAMIC TELESCOPE DEVICE
Filed Feb. 3, 1948   11 Sheets-Sheet 3

Inventor
Roger Hayward

By
G. J. Kessenich, J. H. Church & A. W. Dew
Attorneys

Jan. 20, 1953    R. HAYWARD    2,625,853
PANORAMIC TELESCOPE DEVICE
Filed Feb. 3, 1948    11 Sheets-Sheet 4

Inventor
Roger Hayward
By
G. J. Kessenich, J. H. Church + A. W. Dew
Attorneys

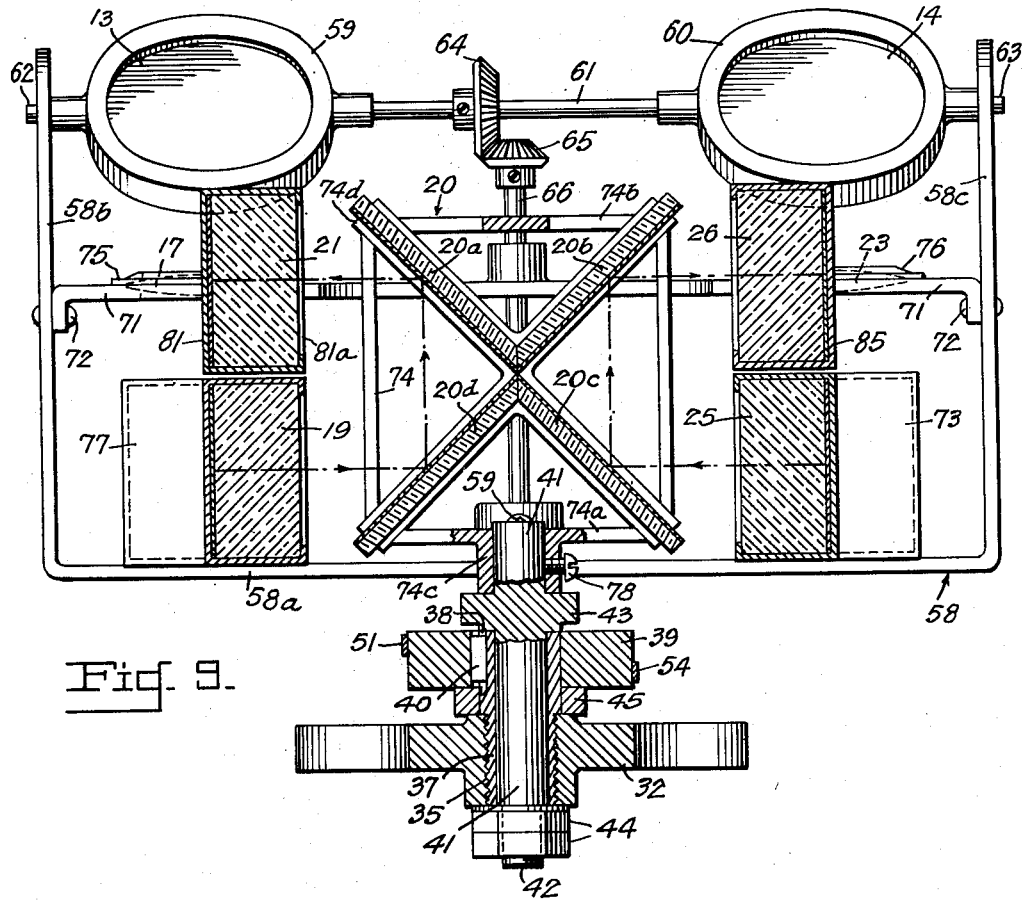
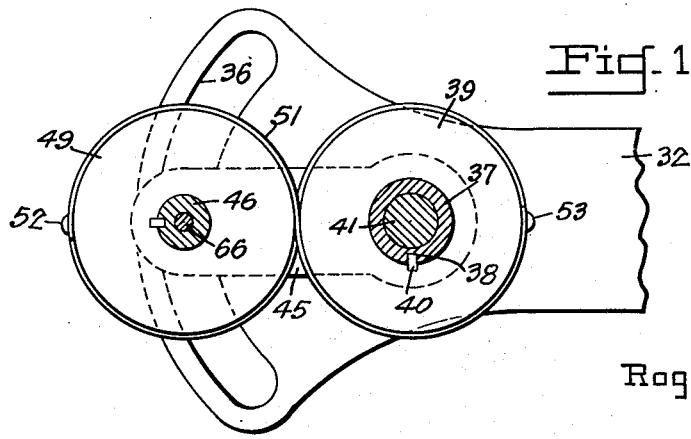

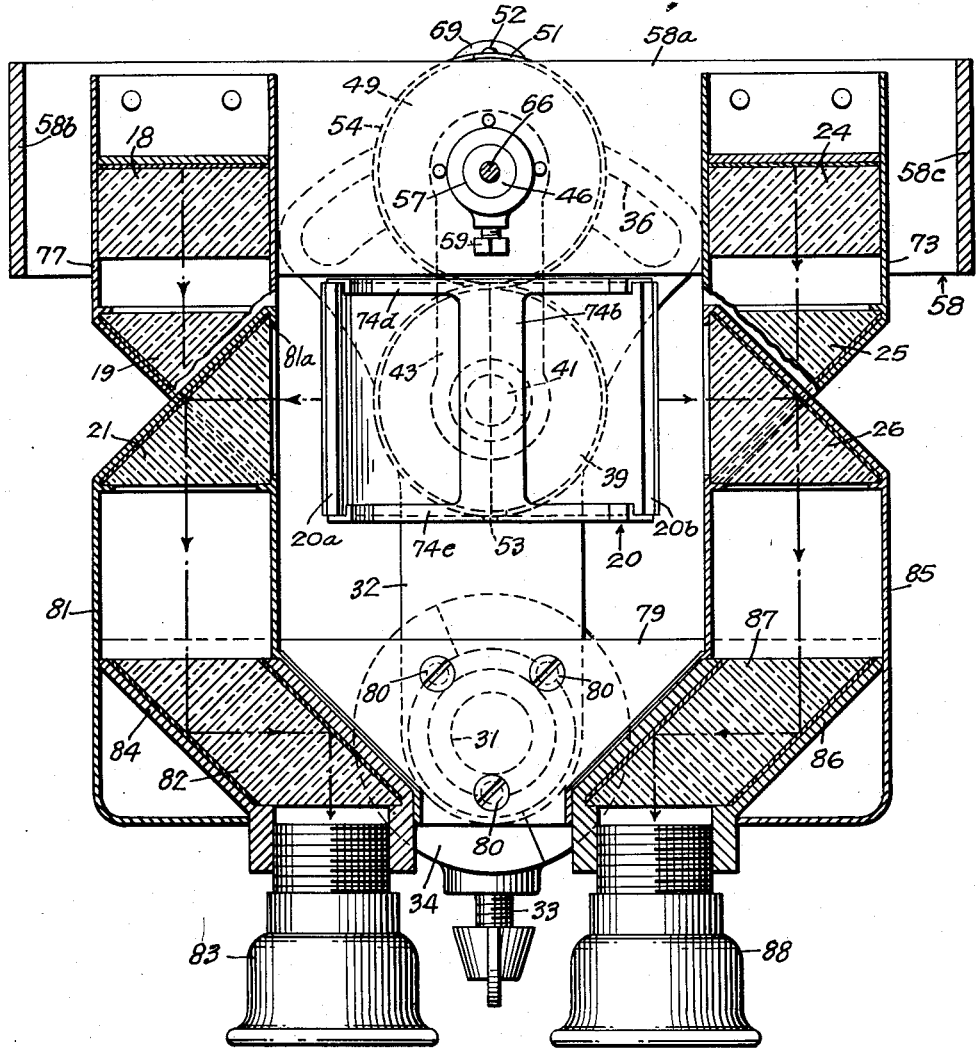

Jan. 20, 1953  R. HAYWARD  2,625,853
PANORAMIC TELESCOPE DEVICE
Filed Feb. 3, 1948  11 Sheets-Sheet 7
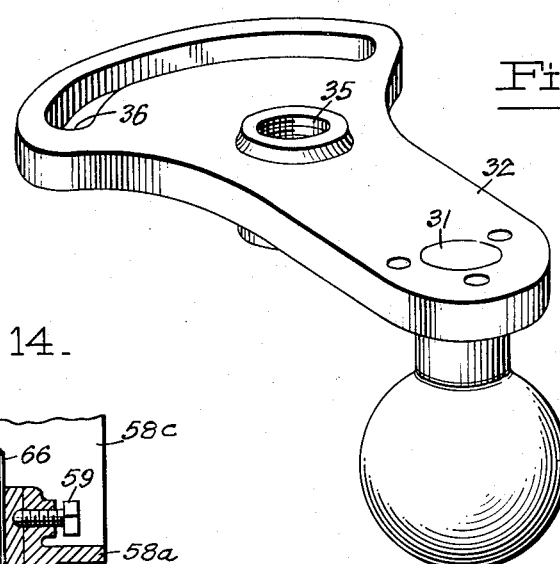
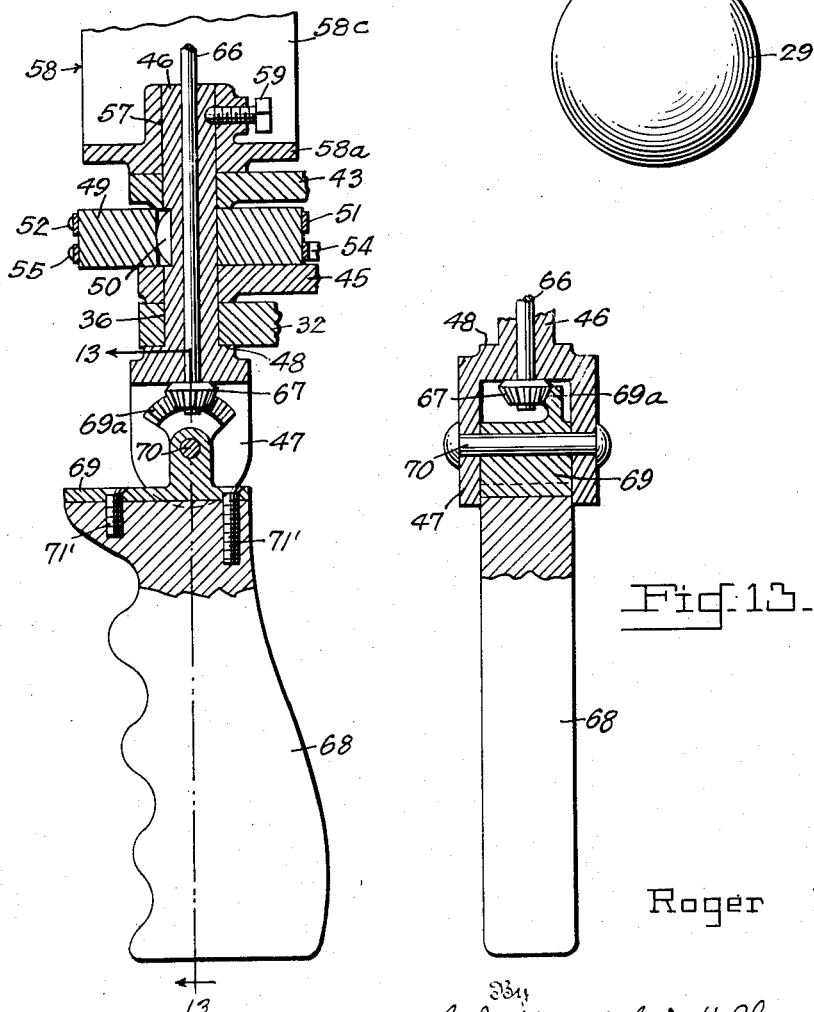
Inventor
Roger Hayward
G. J. Kessenich, J. H. Church & A. W. Dew
Attorneys Inventor
Roger Hayward Jan. 20, 1953  R. HAYWARD  2,625,853
PANORAMIC TELESCOPE DEVICE
Filed Feb. 3, 1948  11 Sheets-Sheet 9

Inventor
Roger Hayward

By G. J. Kessenich, J. H. Church + A. W. Dew
Attorneys

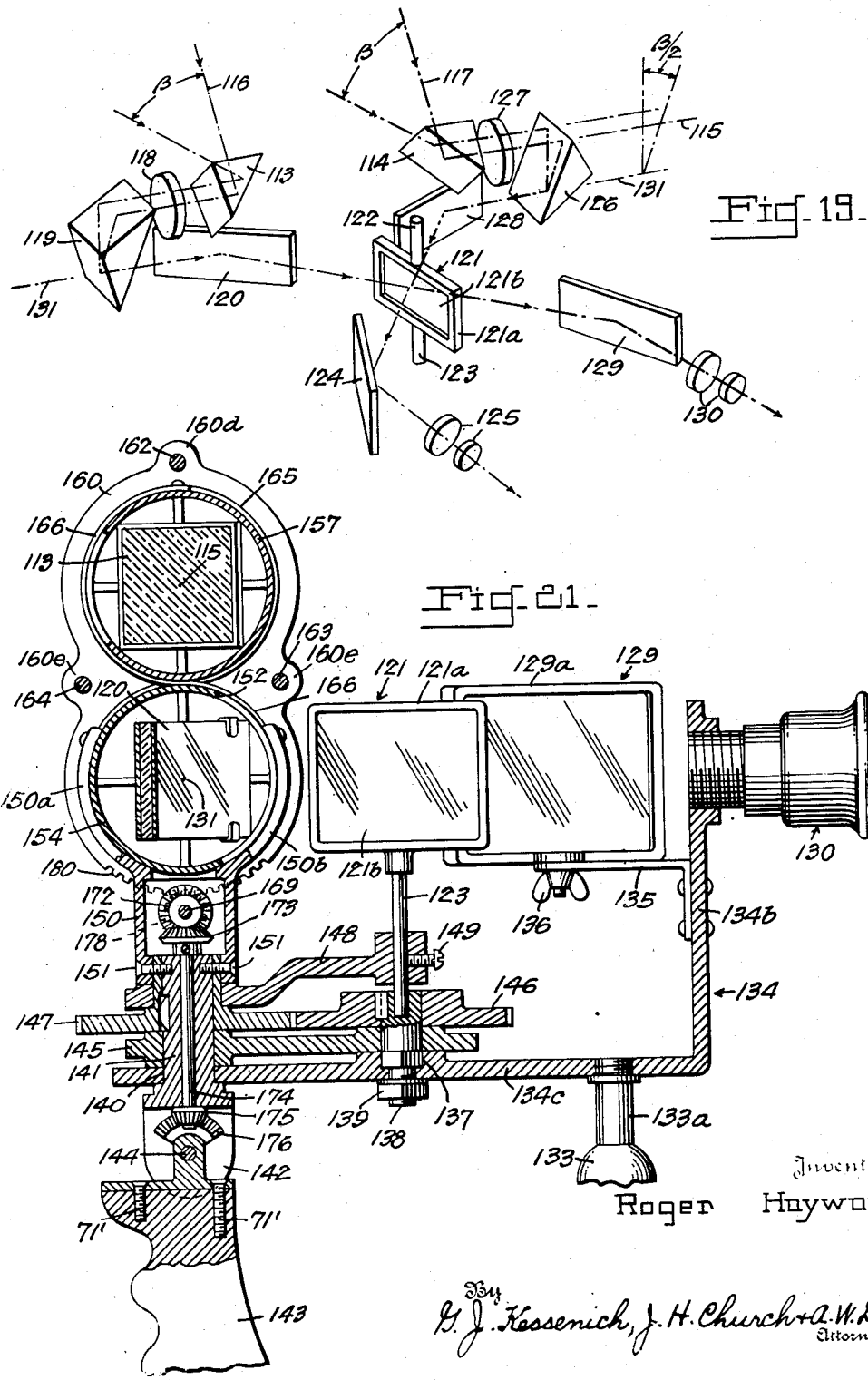

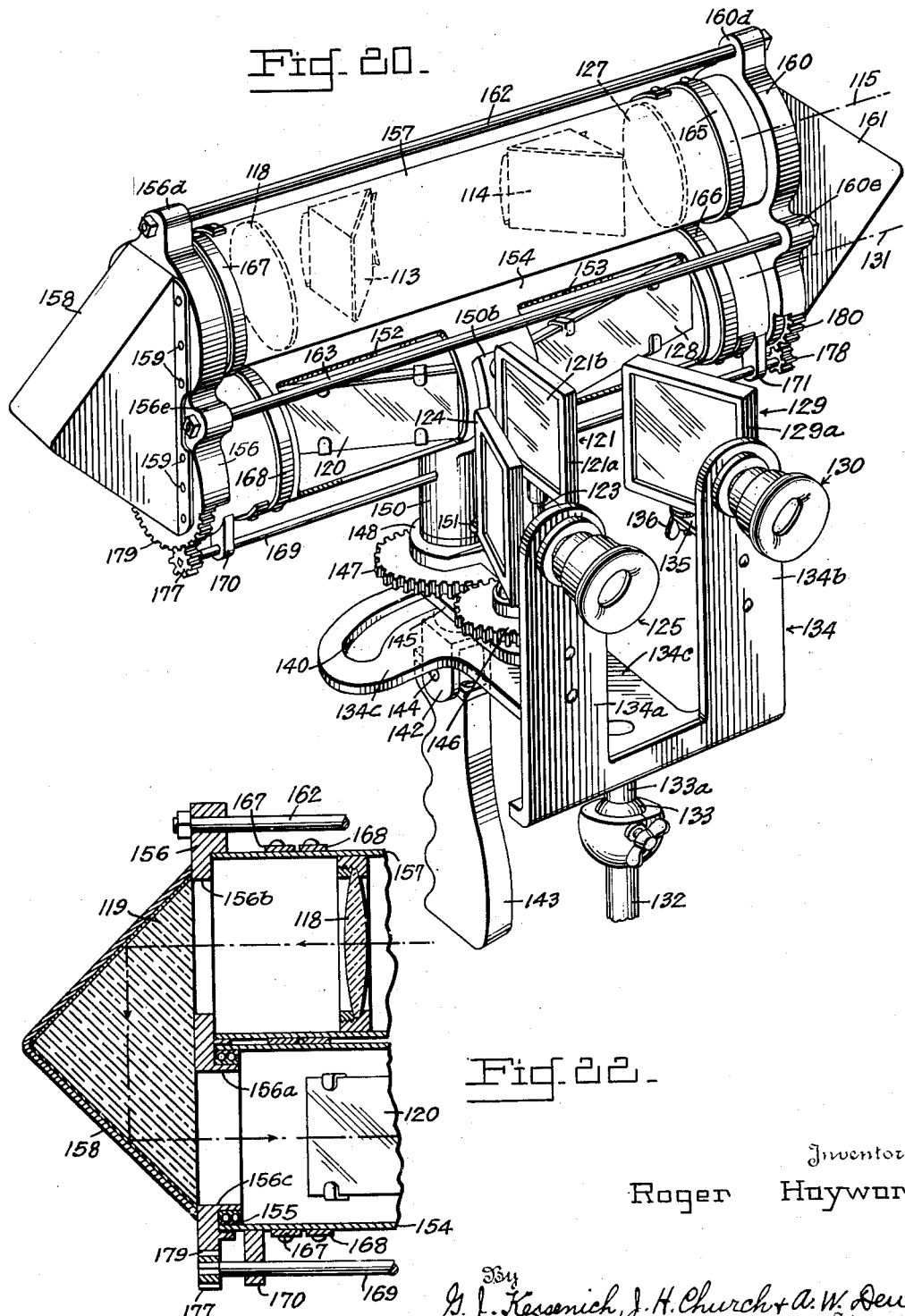

Patented Jan. 20, 1953

2,625,853

UNITED STATES PATENT OFFICE 2,625,853

PANORAMIC TELESCOPE DEVICE

Roger Hayward, Pasadena, Calif., assignor to the United States of America as represented by the Secretary of the Army Application February 3, 1948, Serial No. 6,030

19 Claims. (Cl. 88—32)

This invention relates to panoramic or scanning telescopes and, more particularly, to a binocular panoramic telescope intended for use in positions where movement of an observer's head is restricted. One example of a situation where such instruments are of particular use is in combat tanks where the turret gunner must be able to scan a relatively wide area, vertically and horizontally but, because of his cramped location within the turret, and the necessarily restricted viewing opening in the turret wall, is unable to carry out the necessary observations by movement of his head. Numerous other situations arise where such sights are of particular utility and importance, such as observation by the pilot of a fighter aircraft or the turrent gunners of a bomber.

Accordingly, it is an object of the invention to provide a panoramic telescope which, while relatively simple to construct, is highly accurate over its entire range of movement.

A further object is the provision of a binocular scanning instrument wherein the movable entrance reflectors are rigidly connected for movement as a unit so that no possibility of loss of stereoscopic vision exists.

Another object is to provide scanning instrument of the type described wherein vertical and lateral angular movement of the line of sight is effected by corresponding rotation of a single control element or handle.

In the drawings:

Fig. 1 is a perspective schematic view of a monocular type scanner adapted for use with the optics of a simple telescope which normally produces an inverted image and which illustrates the rolling cylinder principle utilized in the more refined models subsequently illustrated.

Figure 2:
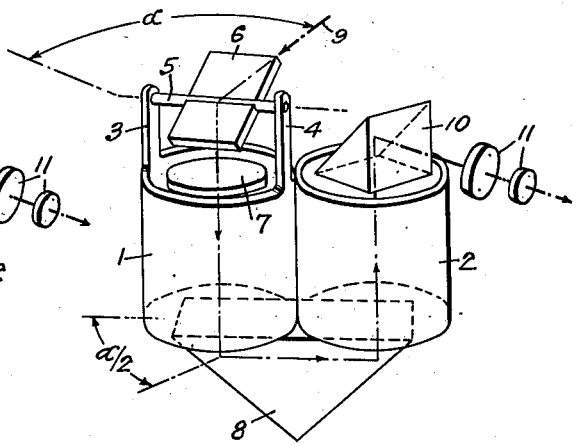
Figure 3:
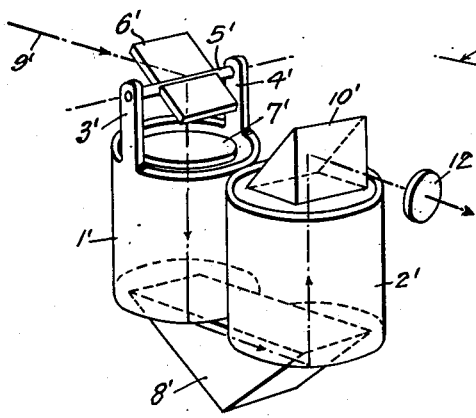
Figure 4:
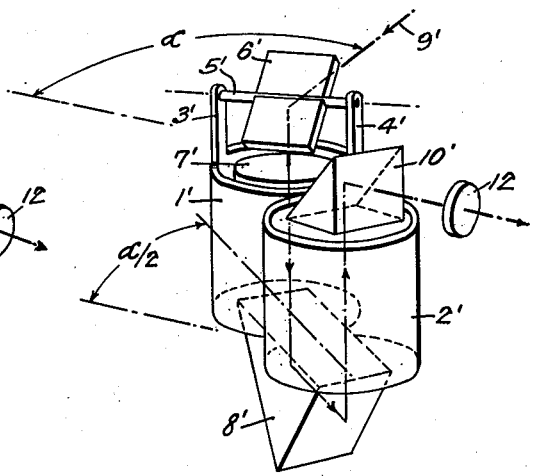
Figure 5:
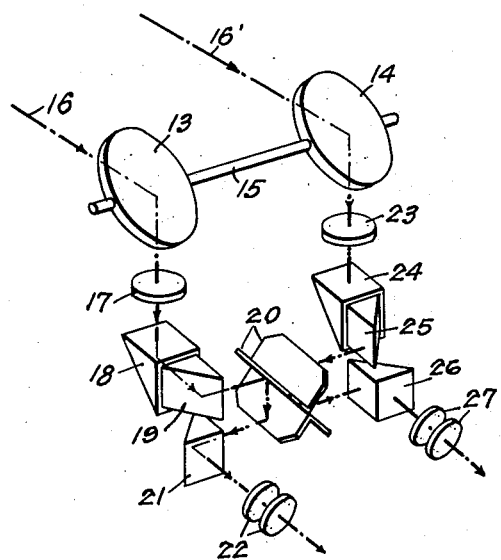
Figure 6:
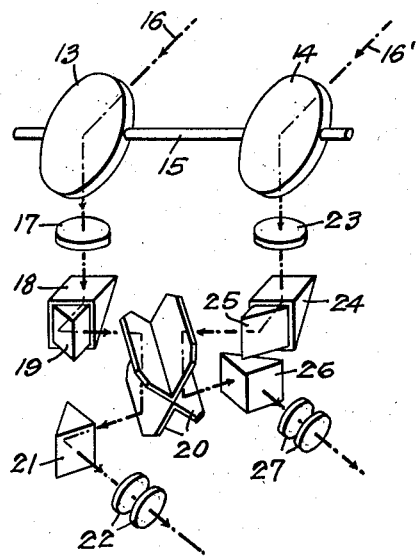
Figure 7:
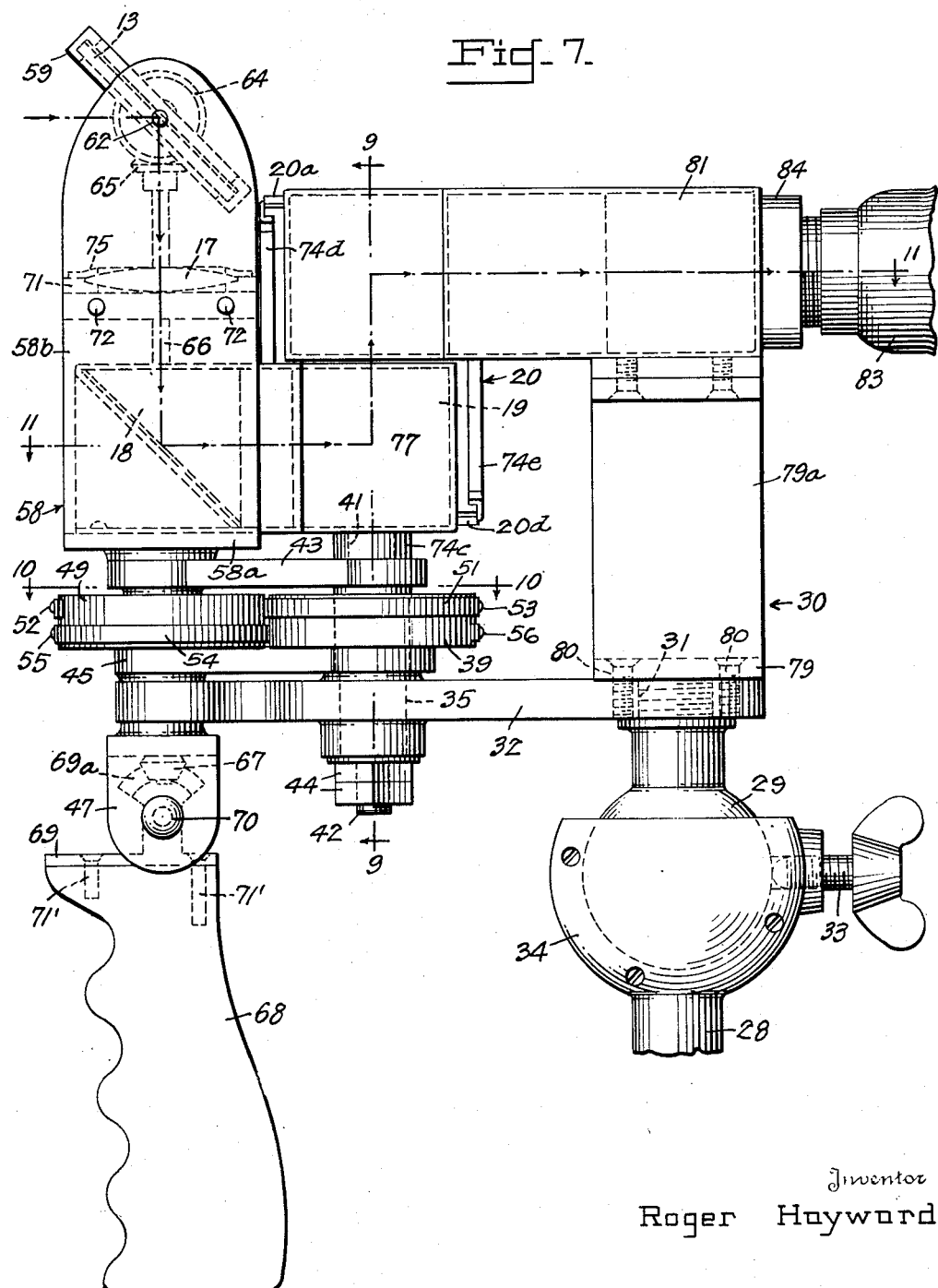
Figure 8:
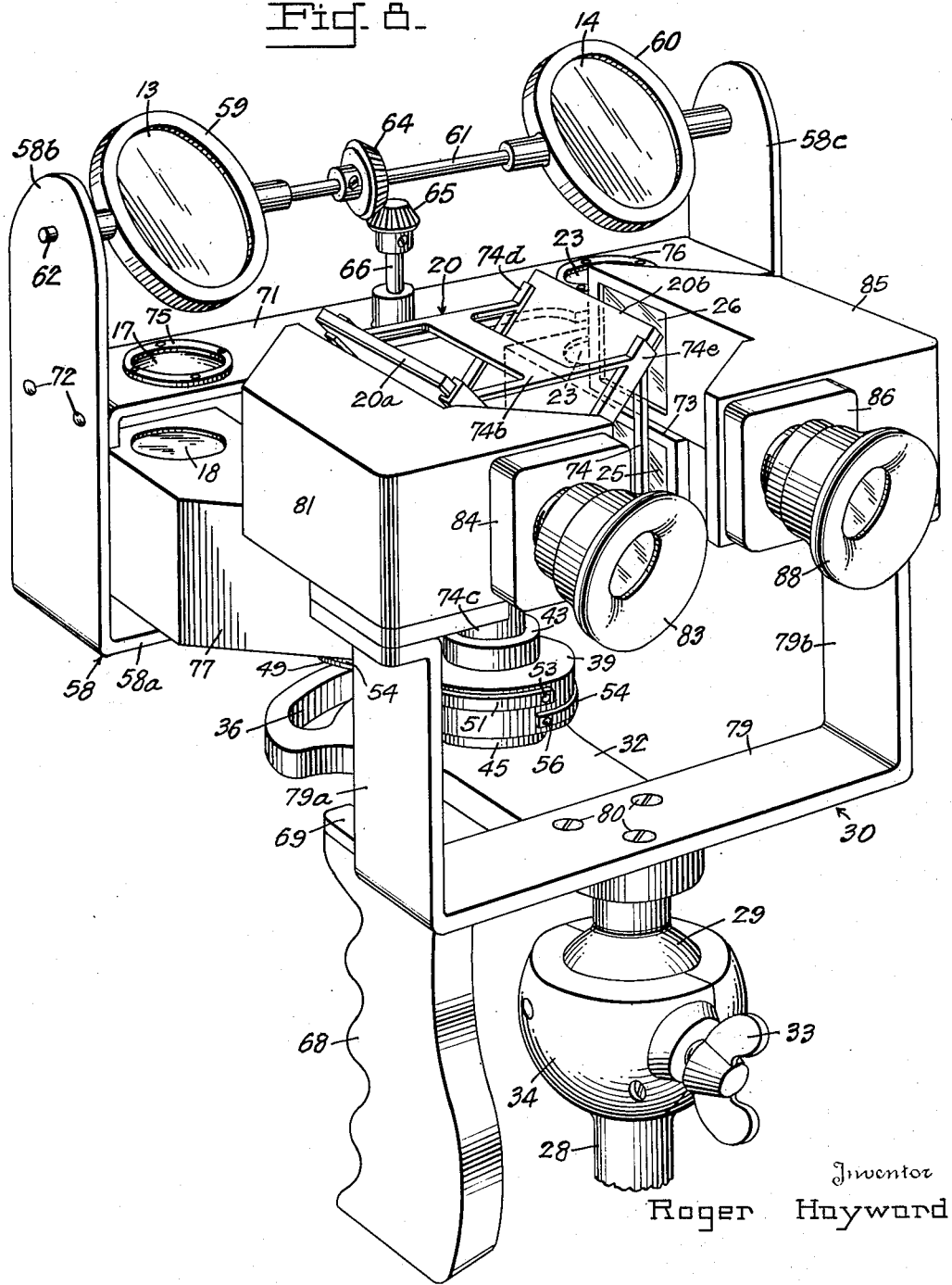
Figure 15:
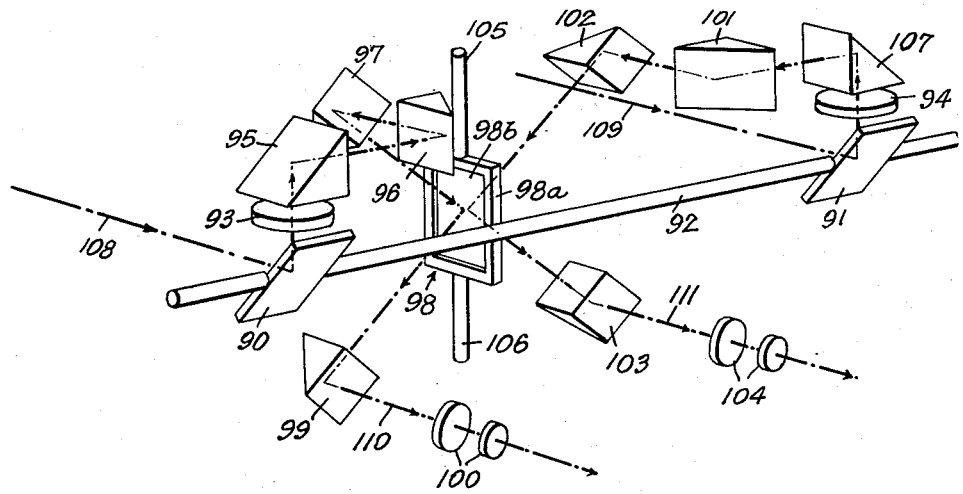
Figure 16:
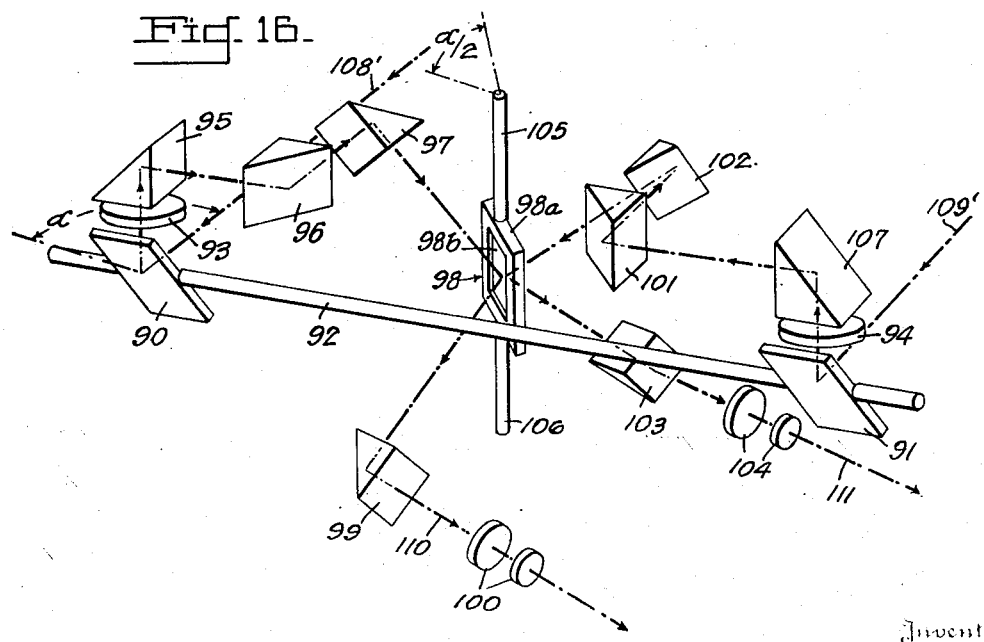
Figure 17:
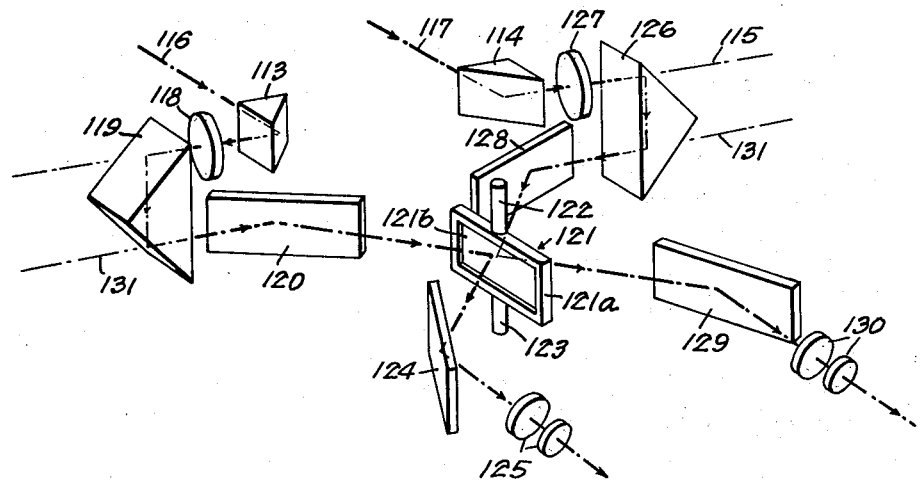
Figure 18:
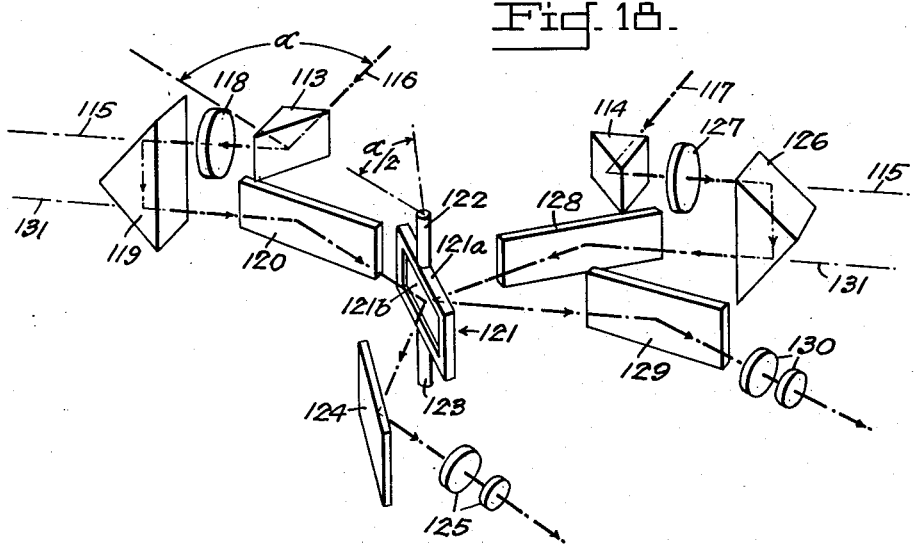

Fig. 2 is a view corresponding to Fig. 1 in which the line of sight has been rotated through a horizontal angle a, Fig. 3 is a perspective schematic view of a monocular type, analagous to Figs. 1 and 2 and adapted to the optics of a Gallilean telescope which normally produces an erect image and which can also be used without any lens optics if magnification is not required, Fig. 4 is a view corresponding to Fig. 3 but showing the line of sight rotated horizontally through the angle a, Fig. 5 is a schematic perspective view of a binocular type instrument utilizing the principles illustrated in Figs. 1 to 4 and a special type of crossed erecting mirror, Fig. 6 is a view corresponding to Fig. 5 but showing the line of sight rotated horizontally through approximately 90°, Fig. 7 is a side elevation of one form of practical embodiment of a binocular telescopic scanner utilizing the optics schematically illustrated in Figs. 5 and 6, Fig. 8 is a perspective view of the instrument of Fig. 7 showing in greater detail the mounting and arrangement of the crossed mirrors, Fig. 9 is a sectional view taken in a plane indicated by the line 9—9 of Fig. 7, looking in the direction of the arrows, Fig. 10 is a detail sectional plan taken on a plane indicated by the line 10—10, Fig. 7, and showing the belt drive between the two cylindrical pulleys, Fig. 11 is a horizontal section taken upon the line 11—11 of Fig. 7 except only that for greater clarity of illustration, the crossed mirrors are shown in plan, Fig. 12 is a perspective detail view of the universal mounting plate of the instrument shown in Figs. 7 to 11, Fig. 13 is a sectional detail view of the control handle, and taken upon a plane identified by the line 13—13, Fig. 14, Fig. 14 is a sectional elevation showing in detail the handle mounting and its connections, Fig. 15 is a perspective view showing schematically the optics of a second form of binocular telescopic scanner using a two-sided pellicle mirror in place of the crossed mirror of Figs. 7 to 14, Fig. 16 is a view corresponding to Fig. 15 but showing the lines of sight rotated clockwise through a substantial horizontal angle, Fig. 17 is a perspective view showing schematically a form of the invention generally corresponding to Figs. 15 and 16, but employing fewer separate optical elements and generally simpler in construction, Fig. 18 is a view corresponding to Fig. 17 wherein the lines of sight have been rotated horizontally clockwise, through an angle a, Fig. 19 is a view corresponding to Fig. 17 wherein the lines of sight have been elevated through a substantial angle β, Fig. 20 is a perspective view of an instrument embodying the optics of Figs. 17, 18 and 19 in position with the lines of sight substantially horizontal and parallel with the optical axes of the eyepieces, Fig. 21 is a central section through the instrument of Fig. 20 in a vertical plane substantially midway between and parallel with the axes of the eyepieces, and Fig. 22 is a detail view in vertical section showing the left Porro prism, its frame, and the mounting of the cylinders therein.

Referring in detail to Figs. 1 and 2, reference numerals 1 and 2 identify two identical hollow cylinders or tube sections having their surfaces held in pure rolling contact by any suitable mechanism, not shown. Cylinder 1 has parallel upstanding projections 3 and 4 formed at their upper ends to provide bearings for an axle 5 extending diametrically across the cylinder. An entrance reflector or mirror 6 is secured to axle 5 so that its reflecting surface contains the pivot axis defined by the axle. An objective 7 is mounted in cylinder 1 below mirror 6 and acts to form a real image of the field of view reflected thereto by reflector 6.

A Porro prism 8 extends over the lower ends of cylinders 1 and 2 and is so related therewith that the axes of the two cylinders always intersect the same points, respectively, of the prism. Thus, as cylinder 1 rolls about cylinder 2 to horizontally vary the direction of the line of sight 9, the prism 8 rotates through an angle equal to the angle of revolution of the axis of cylinder 1, about the axis of cylinder 2. This angle, as is well known, is equal to one-half the angle of rotation of cylinder 1 about its axis, that is, one-half the angle of horizontal movement of the line of sight 9.

Poro prism 8 acts to reflect the rays passing objective 7, to a simple prism 10, fixed to the top of fixed cylinder 2. Prism 10 then acts to reflect the rays rearwardly to an eyepiece generally indicated at 11. Thus, by causing cylinder 1 to roll on cylinder 2, the line of sight may be moved in azimuth while, because of the half-angle of rotation of prism 8, the field of view as seen in fixed eyepiece 11 is erect for all adjustments in azimuth of the line of sight. Fig. 2 indicates that while the line of sight has been rotated clockwise through the angle a from the position shown upon Fig. 1, Porro prism 8 has rotated through the angle a/2 in the same direction. Also, by tilting mirror 6, the line of sight can be moved angularly in a vertical direction. Thus, within the physical limits of the instrument, the line of sight may be directed vertically and horizontally to scan any desired area while the head and eye of the observer remains stationary with eyepiece 11.

In Figs. 3 and 4 is shown a system analagous to the form of Figs. 1 and 2, but adapted to the optics of a Gallilean telescope. Since all parts, except the eyepiece, may be duplicates of the corresponding parts shown upon Figs. 1 and 2, they have been given the same reference numerals, primed, as have been used to identify corresponding parts upon Figs. 1 and 2. Consequently, it is deemed sufficient to point out cylinders 1' and 2', uprights 3" and 4' of cylinder 1', axle 5', entrance reflector 6', objective 7', Porro prism 8', and prism 10'. The arrangement of the parts may be the same as in the species of Figs. 1 and 2 except that in the straight forward viewing position cylinder 2', its prism 10' and Porro prism 8', are revolved 90° about cylinder 1' from the corresponding position of the parts in the species of Figs. 1 and 2. The usual diverging eyelens 12 is mounted in fixed position, as are cylinder 2' and prism 10' so that scanning may be effected over a relatively wide area by rotating cylinder 1' and tilting reflector 6'.

In Figs. 5 and 6, I have schematically illustrated one form of binocular panoramic telescope employing the principles illustrated by Figs. 1 to 4. In these figures, a pair of entrance reflectors 13 and 14 are fixed in parallel relation to a shaft 15 which is journaled by bearings not shown, for movement about its own axis, to thereby angularly move the line of sight in elevation. The coplanar reflecting surfaces of these reflectors contain the axis of rotation of shaft 15.

The rays from a distant object, typified by principal ray 16, are reflected at 13, downwardly through objective 17 to double prism 18, 19. From prism 19, they are reflected laterally inwardly to a crossed mirror 20, thence laterally outwardly to prism 21 and by prism 21 rearwardly to left eyepiece 22. The rays from the same field of view proceeding to mirror 14, as typified by principal ray 16', are reflected in an analogous path to objective 23, prisms 24 and 25, mirror 26, prism 26 and right eyepiece 27.

Mirror 20 is formed as two pairs of reflecting surfaces, each pair being coplanar, and with the planes defined thereby mutually normal. In the "normal" position of the parts shown upon Fig. 5, that is, when the lines of sight lie in vertical planes parallel to the principal axes of the eyepieces, the horizontal line of intersection of the two planes determined by the reflecting surfaces of mirror 20, is also parallel to the axes of the eyepieces.

Reflectors 13 and 14, objectives 17 and 23, and prisms 18, 19 and 24, 25, are mounted by means, one form of which will be described subsequently, for revolution as a unit about a vertical axis which intersects the aforementioned horizontal line of intersection of the reflecting surfaces of mirror 20. Connections subsequently described are provided by which mirror 20 is rotated about the aforesaid vertical axis, through one-half the angle of rotation of the entrance mirrors, etc., that is, one-half the angle of azimuthal rotation of the lines of sight. The optical elements thus constitute a system which is equivalent to a double-face reflector without material thickness, and a normal field of view is afforded at eyepieces 22 and 27. That is to say, the field is erect for all horizontal positions of the lines of sight irrespective of its rotational position in azimuth.

In Figs. 7 to 14, inclusive, I have shown a practical embodiment of the form of the invention schematically disclosed upon Figs. 5 and 6. Referring in detail to Figs. 7-14, for purposes of illustration, the device is shown supported by a base 28 having a generally spherical socket 34 formed in its upper end in which fits a ball 29, rigidly secured to a support 30, as by a projection 31, Fig. 7, on ball 29, threaded into an aperture in plate 32 forming a part of support 30. A set screw 33 threaded through the wall of socket 34 operates to clamp the ball in adjusted position. From Fig. 12, it will be noted that plate 32 has a bossed threaded opening 35 and a slot 36 concentric of the axis of opening 35.

A sleeve 37 is threaded into opening 35 and projects upwardly therefrom. As seen at Fig. 9, this sleeve has a keyway 38 formed in its upper cylindrical end and a pulley 39 is keyed thereto by key 40. In this manner, pulley 39 is rigid with plate or bracket 32. Sleeve 37 has a smooth axial bore which acts as a journal for a stub shaft 41 having a reduced threaded lower end 42. A link 43 is integral with and extends radially from the upper portion of shaft 41. As seen more clearly on Fig. 14, the outer end of link 43 extends over and across the slot 36 in plate 32. Shaft 41 has a smooth bearing fit in sleeve 37 and is held against axial movement therein by a shoulder at its top, and lock nuts 44 at the bottom. A second link 45 is journaled upon the smooth upper end of sleeve 37. This link is of the same effective length as link 43 so that bearing holes in the outer ends of each, are in alignment, as will be seen on reference to Fig. 14. It will also be noted from Figs. 10 and 14, that these holes are at all times aligned with slot 36 and have a diameter equal to or a little less than, the radial dimension of the slot.

A shaft section 46 is journaled in the aligned apertures formed in the ends of links 43 and 45. The shaft has a lower end, forked as at 47, Figs. 7 and 14, which end has a shoulder 48 adapted to fit against the lower surface of bracket 32. A plain cylindrical pulley 49 is keyed by key 40 to shaft 46 between links 43 and 45. This pulley has the same external diameter as pulley 39. The dimensions are so chosen that the peripheries of the two pulleys are substantially in contact. A flexible metallic band or belt 51 is secured at 52 to pulley 49, Figs. 7 and 10, and is wound clockwise a half turn about 49 and a half turn counterclockwise about pulley 39. Its other end is secured to pulley 39 at 53. A second flexible metallic band or belt 54 has one end attached to pulley 49 at 55 and is wound counterclockwise about pulley 49 a half turn, then clockwise about pulley 39 a half turn. The other end of belt 54 is attached to pulley 39 at 56. The pulleys are spaced just enough to permit the bands to pass between them. Thus, since pulley 39 is fixed, rotation of pulley 49 by means subsequently described, causes pulley 49, in effect, to roll around 39. Links 43 and 45 are thereby revolved about the axis of shaft 41, through one-half the angle of rotation of pulley 49 about its own axis.

Referring particularly to Fig. 14, shaft 46 extends upwardly through its journal opening in link 43 and passes through a flanged opening 57 formed in a U-shaped frame 58. A set screw 59 is threaded into a radial hole in the flange and engages shaft 46 whereby to lock the frame 58 rigidly to the shaft so that they are compelled to turn as a unit.

From Figs. 7, 9 and 11, it is seen that the frame 58 comprises a horizontal or bight portion 58a connecting right and left uprights 58b and 58c. The upper ends of these uprights are apertured to form bearing supports for the entrance reflector assembly which may consist of reflector frames or rims 59 and 60 carrying reflectors 13 and 14, respectively, and connected in coplanar relation by an intermediate shaft 61. Trunnions 62 and 63 extending oppositely and coaxially with shaft 61 are received in the aforementioned bearing supports whereby the reflector assembly is rotatable about the axis of shaft 61. A pinion 64 is pinned to shaft 61 and meshes with a pinion 65 pinned to the upper end of a shaft 66 which, as best seen at Figs. 13 and 14, passes with a smooth fit through the central bore in shaft 46 and has a pinion 67 secured to its lower end.

A control handle 68 has a metallic bearing portion 69 secured to the upper face of the handle by fastenings 71'. This portion fits smoothly between the projections formed by the lower forked end and is pivoted thereto by a shaft 70. The portion 69 is formed with a gear segment 69a in mesh with pinion 67. In this manner, as handle 68 is pivoted about the axis of shaft 70, shaft 66 is rotated to correspondingly pivot entrance reflectors 59 and 60 about the common axis of shaft 61 and trunnions 62 and 63. From the connections shown it will be noted that the reflectors tilt in the same direction in which handle 68 is tilted. Furthermore, twisting or turning of handle 68 turns shaft 46 and frame 58 as a unit, together with all parts carried thereby, to turn the lines of sight in azimuth since pulley 49 is fixed to shaft 46, while the pulley is connected by belts 51 and 54 with fixed pulley 39, twisting of handle 58 causes shaft 46 to ride in arcuate slot 36 and pivots links 43 and 45 about the axis of shaft 41, through an angle which is half the angle of turning of shaft 46 about its own axis. The purpose of this will be subsequently described. For the present, it is pointed out that, by the foregoing construction, handle 68 may be used to direct the line of sight in azimuth and/or elevation.

Referring more particularly to Figs. 7, 8 and 9, a plate 71 is fixed at its ends, as by rivets 72 between verticals 58b and 58c, a sufficient distance below reflectors 59 and 60 to clear the same for all operating positions thereof. Objective 17 is held by ring 75 over an opening in plate 71 directly below reflector 59. Right objective 23 is held by ring 76 over an opening in plate 71 below reflector 60. Both objectives are thus fixedly mounted on frame 58.

At its left side below objective 17, frame 58 supports a case or box 77 within which prism 18 is mounted to receive the rays from objective 17 and to reflect them 90° rearwardly to prism 19, also fixed within case 77. As explained in connection with the lay-out of Figs. 5 and 6, prism 19 operates to reflect the rays laterally inwardly to crossed mirror 20. By a similar construction a case or box 73 is fixedly carried by frame 58 at the right end thereof below objective 23. This box carries prisms 24 and 25 to reflect the rays from objective 23 rearwardly and thence laterally inwardly to mirror 20, as previously explained.

The crossed mirror and its mounting and connections to the instrument, are best shown upon Figs. 7, 8 and 9. Shaft 41 has previously been described as journaled in sleeve 37 and as having link 43 integral with, or rigidly secured to its upper end. The mirror frame 74 comprises generally I-shaped base and top portions 74a and 74b, respectively. The base is provided centrally with a sleeve 74c which fits over the upwardly projecting end of shaft 41 and is fixed thereto by a screw 78. The mirror frame is completed by front and rear channel members 74d and 74e of generally X shape and rigidly attached to the ends of the top and bottom I members to form an open frame of a shape obvious from inspection of Figs. 8 and 9.

The confronting channels of X members 74d and 74e are thus positioned to receive and securely hold the four mirror sections 20a, 20b, 20c and 20d. From Fig. 9 it is seen that the reflecting surfaces of the mirror sections 20a and 20c, are coplanar, as are those of sections 20b and 20d, and that the two planes thus determined are mutually normal. In Fig. 9, the line of intersection of the two planes is in "normal" or central position and is perpendicular to the plane of the sheet, and in a horizontal plane passing midway between prisms 19 and 25 on the one side of said plane, and 21 and 26 on the other side thereof. Thus rays are reflected from prism 19 to mirror section 20d, thence vertically to section 20a and laterally outwardly to prism 21. At the other or right side, the rays reflected from prism 25 strike mirror section 20c and are thence reflected vertically to section 20b and laterally outwardly to prism 26. Since mirror 20 is fixed to shaft 41 and link 43, it always rotates from central or "normal" position, through half the angle that frame 58 and the parts carried thereby, rotate about the axis of shaft 46 and the images of a remote object being observed, are maintained erect in the field of view of the eyepieces. The arrangement of optical parts as depicted upon Figs. 5 and 6 is the close analogue of that shown in the species of Figs. 7 to 11, except only that in Figs. 5 and 6, for greater clarity of illustration, prisms 21 and 26 are shown below prisms 19 and 25, respectively. The arrangement of Figs. 7 to 11 affords greater compactness as will be obvious from inspection. It is desired to point out that prisms 18, 19, 24 and 25 are fixed to and supported by frame 58 and move with such frame as a unit.

A U-shaped bracket 79 forms a part of support 30 and is secured to bracket 32 by screws 80, Fig. 8. The left upright 79a of bracket 79, mounts a prism housing and eyepiece support 81. This housing is shaped to receive prism 21 at its forward portion. The rays from mirror section 20a pass thereto through opening 81a, Fig. 11. Housing 81 has its rear portion shaped to receive and mount holder 84 of a double prism 82, which receives the rays from prism 21 and reflects them into left eyepiece 83. This eyepiece, as shown, is threaded into an aperture in holder 84. Focussing may be effected by turning the eyepiece.

The right upright 79b of bracket 79 carries a prism housing and eyepiece support 85 which is shaped at its forward portion to receive and rigidly support prism 26, Fig. 11, and at its rear portion, to receive prism holder 86. Double prism 87, which is a duplicate of prism 82, is mounted in this holder and acts to receive the rays from prism 26 and to reflect them into eyepiece 88 threadedly mounted in the holder 86.

In use, set screw 33 will be loosened and the entire instrument adjusted in the general direction of the field or area to be scanned. The screw is tightened and the user, while looking into the eyepieces, 83 and 88, grasps handle 68. If purely lateral movement of the line of sight is desired, the handle will be twisted or turned only about the axis of shaft 46, while if elevational movement only is desired, the handle will be pivoted about the axis of shaft 70. Of course the two movements can be effected simultaneously to impart a movement to the lines of sight having vertical and lateral components. In all cases, the angular movement imparted to the lines of sight corresponds with the movement of the handle 68 so that control is made in a natural and facile way. The field of view is in the same orientation as would be observed by looking directly along the lines of sight 16 and 16'. It will be understood that double prisms 82 and 87 are used to provide a greater separation or spacing between prisms 18, 19 and 21 on the left side, and 24, 25 and 26 upon the right side. It is contemplated that modifications may be used in which these double prisms are omitted. While separate and distinct entrance reflectors 13 and 14 are shown, it is obvious that, with slight modification, a single entrance mirror may be substituted. While I have shown the instrument in the form of a telescope, it will be clear that the magnification feature may be omitted when no magnification is required, without altering the general construction or the principle of operation.

At Figs. 15 and 16 I have schematically shown a form of the invention corresponding generally to that of Figs. 5 and 6 but employing a somewhat different form and arrangement of optical elements, as will be clear from the succeeding description.

Left and right entrance mirrors or reflectors 90 and 91 are fixed in spaced, coplanar relation to a shaft 92, with their reflecting surfaces containing the axis of the shaft. Shaft 92 is journaled in a frame, not shown, for pivotal movement about a normally horizontal axis. The aforesaid frame mounts a pair of objectives 93 and 94, each of which is positioned to receive the rays reflected from a respective mirror. This frame corresponds to frame 58, Figs. 7 to 11, and, like that frame, is pivotal about a normally vertical axis.

The rays from objective 93 pass in succession to prisms 95, 96 and 97. Prism 95 acts to reflect the rays 90° inwardly parallel with the axis of shaft 92 to prism 96 which is positioned with its reflecting face vertical and at 45° to the axis of shaft 92. Prism 96 thus acts to reflect the rays horizontally forward to prism 97. This prism 97 has one face normal to the reflected rays proceeding from prism 96 and is tilted 45° about the central one of said rays so that the rays reflected therefrom proceed downwardly in a plane parallel with shaft 92, to one face of a double-face reflector 98.

Reflector 98 consists of a rectangular frame 98a in which is mounted a thin film or pellicle 98b having both sides reflecting, as by silvering. From reflector 98, the rays from the prism 97 are reflected downwardly and outwardly to a fixed prism 99 which is so positioned as to reflect the rays rearwardly to left eyepiece 100. Similarly, rays from right objective 94 are received by prism 107 and thence reflected inwardly, parallel with shaft 92, to prism 101 by which the rays are deflected forwardly to prism 102. This prism 102 is positioned to reflect the rays downwardly and inwardly to the other reflecting face of mirror 98. From mirror 98 the rays are reflected downwardly to fixed prism 103, thence rearwardly to right eyepiece 104.

Mirror 98 is mounted, as by trunnions 105 and 106, for pivotal movement about a normally vertical axis, as in the case of the crossed mirrors device 20 of Figs. 5 and 6. Prisms 95, 96, 97, 107, 101 and 102 are all carried by the aforementioned frame and are thus all fixed relatively to one another and to objectives 93 and 94. Thus, all the aforementioned parts, together with shaft 92 and entrance reflectors 90 and 91, move as a unit about the vertical axis. Suitable connections are provided whereby mirror 98 is rotated about the axis defined by trunnions 105 and 106, through one-half the angle of rotation of the aforementioned frame about its corresponding parallel axis. In this way, the images received by the mirrors 90 and 91 are at all times reflected into the eyepieces to give an erect or normal image.

In the positions of the parts shown upon Fig. 15, the lines of sight are in "normal" or central position parallel with the principal axes 110 and 111 of eyepieces 100 and 104, so that the field of view is straight ahead. Fig. 16 shows the positions of the parts after the line of sight has been rotated in azimuth, that is, about a normally vertical axis, through the angle $a$. It will be noted that mirror 98 has been turned through the angle $a/2$ in the same direction. Of course, movement of the lines of sight vertically is effected simply by rotation of entrance reflectors 90 and 91 as a unit with shaft 92. Because of the particular construction shown wherein reflectors 90 and 91 are fixed to a common shaft, no possibility exists of relative movement in a vertical plane between the lines of sight and stereoscopic vision is maintained for all adjustments of the lines of sight vertically and horizontally.

In Figs. 17, 18 and 19 I have shown schematically, a form of the invention using a fewer number of parts than the form of Figs. 15 and 16. A practical working embodiment of the species of Figs. 17, 18 and 19, will be subsequently described in connection with Figs. 20, 21 and 22.

Referring in detail to Figs. 17–19, a pair of entrance reflectors or prisms 113 and 114 are mounted with their forward faces coplanar, for movement as a unit about the normally horizontal axis 115, to thereby direct the parallel lines of sight 116 and 117 in elevation. From prism 113, the rays are reflected parallel with axis 115 through objective 118 to a Porro prism 119, thence reversely to a mirror or reflector 120 positioned at an angle, in a vertical plane, across the reflected rays, to divert them to mirror 121. This mirror may be a duplicate of mirror 98, described in connection with Figs. 15 and 16, and may be similarly mounted. Consequently, it will be sufficient to identify frame 121a, pellicle 121b having both sides specular, and trunnions 122 and 123. From the mirror 121, the rays proceeding from reflector 120, are reflected to a fixed mirror 124 and thence rearwardly to left eyepiece 125.

Similarly, rays proceeding from the field of view to the right entrance prism 114 are reflected thereby outwardly parallel with axis 115, through objective 127 to right Porro prism 126. The rays reversed by prism 126 proceed inwardly parallel with axis 115 and are reflected rearwardly and inwardly by fixed mirror 128, to the right-hand specular surface of double reflector 121. From 121 the rays are reflected rearwardly and outwardly to fixed mirror 129 and by the latter, rearwardly into right eyepiece 130.

Fig. 17 shows the positions of the parts when the lines of sight are in "normal" or straight ahead horizontal position. In this position, the plane of pellicle 121b is midway between lines 116 and 117 and the principal axes of eyepieces 125 and 130. In Fig. 18, the lines of sight have been rotated horizontally clockwise through an angle α. It will be noted that prisms 113, 114, objectives 118, 127, and Porro prisms 119, 126, have rotated as a unit, while reflector 121 has rotated clockwise through the angle of α/2 and mirrors 120, 124, 128, 129, together with eyepieces 125 and 130 have remained fixed. In Fig. 19, the lines of sight, while in the same azimuthal plane as in Fig. 17, have been elevated from the horizontal, through the angle β. This has been done by revolving prisms 113 and 114 about the external horizontal axis 131. At the same time, Porro prisms 119 and 126 have been elevated or rotated about the same axis, through the angle β/2. Thus, within the physical ranges of movement for which the instrument is designed, the lines of sight are universally movable into any desired direction while a normal erect image of the field of view is available in the fixed eyepieces.

In Figs. 20, 21 and 22 is shown one practical embodiment of the instrument schematically disclosed in Figs. 17, 18 and 19. Referring in detail to these figures, a base 132, Fig. 20 is provided with a socket to receive a ball 133 having a shank 133a rigidly connected, as by threads, with a bracket 134. This bracket, as best shown at Fig. 20, has right and left spaced upstanding arms 134a and 134b each having a threaded aperture at its upper end to adjustably support a respective eyepiece 125 and 130. From Fig. 21 it will be noted that an angle 135 is secured to arm 134b and that mirror 129 is pivotally mounted thereon for adjustment about a vertical axis. A wing nut 136 may be provided for securing the reflector in adjusted position. This nut may be threaded upon a screw projecting downwardly from, and integral with, the frame 129a of mirror 129. Mirror 124 is mounted in a manner identical with that of mirror 129.

The horizontal forwardly-extending portion 134c, of bracket 134 has an opening 137 in which a stub shaft 138 is fixed by means of a reduced threaded lower end, and a nut 139. Portion 134c also has an arcuate slot 140, concentric of the axis of shaft 138. A short shaft 141 is rotatably and slidably mounted within slot 140. This shaft has a clevis 142 rigid with its lower end and between the arms of which is pivoted a handle 143, by means of a pin or shaft 144, Fig. 21.

A link 145 is pivoted at one end on a smooth portion of shaft 138. At its other end, this link has a bearing aperture coincidental with slot 140 and in which shaft 141 is journaled with a smooth fit. A pinion 146 is fixed to the upper end of shaft 138 above link 145. This pinion meshes with another pinion 147, of identical pitch diameter, secured to shaft 141. Pinion 147 has an upwardly extending hub portion on which one end of a link 148 is journaled. This link has the same effective length as link 145. At its end remote from shaft 141, link 148 has a hub drilled to receive trunnion 123 of mirror 121. A set screw 149 fixes the two together. The end of trunnion 123 projects downwardly with a snug fit into a coaxially drilled hole in the end of shaft 138. In this way, mirror 121 is rotated through an angle determined by the distance that shaft 141 moves in and along slot 140.

A tubular frame 150 extends upwardly from shaft 141 concentric therewith and has a forked upper end consisting of arcuate, upwardly extending arms 150a and 150b. See Fig. 21. These arms embrace and are rigidly attached to the central portion of a generally horizontal cylindrical casing 154, having right and left openings 152 and 153 in its rear wall. Frame 150 is rigidly attached to shaft 141 and the hub of pinion 147, by screws 151. Mirror 120 is mounted within and on casing 154, at the proper angle across the longitudinal axis thereof, to be viewed through opening 152. Likewise, mirror 128 is mounted in and on casing 154 opposite and facing opening 153. Mirror 128 makes an angle with the axis of casing 154, equal and opposite to 120, as is obvious from inspection of Figs. 17 to 20, inclusive.

Referring to Fig. 22, it will be noted that the left end of casing 154 mounts the outer race 155 of an anti-friction bearing. The inner race of this bearing is carried by an end frame and Porro prism support 156 having a rim 156a, Fig. 22, upon which the race is mounted. The frame extends transversely of the axis of casing 154 and has an offset opening or well in which the end of a second cylindrical casing 157 is received. The end of frame 156 has openings 156b and 156c and Porro prism 119 is mounted over these openings and held in position by a cover 158. This cover is secured to frame 156 by screws or rivets 159.

Casings 154 and 157 are of equal length and their right ends are connected by a construction which is duplicate of the one described in the foregoing paragraph. Hence it is sufficient to identify frame 160 and prism cover 161. Frame 156 is provided with lugs such as 156d and 156e having apertures aligned with corresponding apertures in lugs 160d and 160e of frame 160. Through bolts 162, 163 and 164 (Fig. 21) pass through these apertures and act to rigidly unite frames 156 and 160. Casing 157 is journaled by frames 156 and 160 for rotation relatively thereto. If desired, anti-friction bearings may be provided between casing 157 and the aforesaid frames.

Casing 157 is limited to rolling motion about casing 154, by metal straps or belts, in the manner shown for pulleys 39 and 49. Thus a belt 165 is secured at one end to the right end of casing 157 and extends clockwise therearound, as seen in Fig. 21, through substantially 180°, thence counterclockwise through a like angle, about casing 154, to which its other end is attached. A second belt 166 is secured at one end to casing 157, adjacent belt 165 and extends counterclockwise thereabout through substantially 180°, thence clockwise about casing 154 through a like angle. Its other end is secured to the under side of casing 154. The left ends of casing 154 and 157 are connected in an identical manner, so that it is sufficient to identify belts 167 and 168. In this way, in accordance with the principle explained in connection with Figs. 1 and 4, inclusive, cylindrical casing 157 may rotate about its own axis, while revolving about the central longitudinal axis of casing 154. Thus frames 156 and 160, together with Porro prisms 119 and 126, are rotated about the axis of casing 154, through one-half the angle of rotation of casing 157 about its own axis. As the lines of sight are angularly moved in elevation the prisms 119 and 126 thus act to maintain the image in normal or erect position in the eyepieces. Since the entrance prisms 113 and 114 are rigidly united by reason of their common mounting in casing 157, no possibility of their relative movement exists and stereoscopic vision is assured.

Casing 154 is provided at the ends of the lower portions of its wall, with lugs 170 and 171, having aligned bearing apertures in which a shaft 169 is journaled. This shaft passes through apertures in frame 150 and, within the frame, has a bevel pinion 172, in mesh with a second pinion 173 secured to shaft 174. As seen in Fig. 21, this shaft is journaled within an axial bore in shaft 141, and has a bevel pinion 175 attached to its lower end. Pinion 175 meshes with a bevel gear segment 176, fixed to handle 143, concentric of pin 144.

The ends of shaft 169 are provided with pinions 177 and 178, each in mesh with teeth 179 and 180 shown as cut in the lower peripheral portions of frames 156 and 160. In this way, as handle 143 and segment 176 are pivoted about the axis of pin or shaft 144, shaft 174 is turned, to correspondingly turn shaft 169 and pivot frames 156 and 160 and their Porro prisms, in unison about the axis of casing 154. At the same time casing 157 is thereby revolved about the axis of casing 154, and simultaneously rotated upon its own axis, to thereby move the lines of sight in elevation. The gear connections are such that the lines of sight are angularly moved in the same direction or sense as handle 143 and the gear ratios are preferably so selected that the angle of movement of the lines of sight in elevation is approximately equal to the angle of movement of the handle. Since the lines of sight are moved horizontally in the same direction and to the same extent as angular movement of handle 143 and shaft 141, the adjustment is simple and natural in directing the lines of sight to any desired direction. It will be understood that pellicle 121b is only a few thousandths of an inch in thickness so that it may be regarded optically as having no thickness and, therefore, both specular surfaces lie in the axis of trunnion or supporting shaft 123.

While I have shown several embodiments of my invention, numerous modifications, alterations and substitutions of equivalents will occur to those skilled in the optical art, after a study of the foregoing disclosure. For this reason, I desire that the disclosure be taken in an illustrative, rather than a limiting sense, and it is my desire and intention to reserve all such changes as fall within the scope of the subjoined claims.

Having now fully disclosed the invention, what I claim and desire to secure by Letters Patent is:

1. In a binocular panoramic telescope, a bracket, right and left eyepieces fixedly carried by said bracket, a frame journaled on said bracket on a normally vertical first axis between the parallel axes of said eyepieces, entrance reflector means mounted on said frame for pivotal movement about a normally horizontal second axis, right and left objectives carried by said frame, each positioned in the path of rays from respective entrance reflectors to receive rays reflected therefrom, optical means adapted to reflect the rays from each objective to a respective one of said eyepieces, said optical means including a unitary reflecting mirror having reflecting surfaces on opposite sides thereof, said mirror being mounted on said bracket for pivotal movement about a third axis parallel with and laterally offset from said first axis, connections pivoting said unitary reflecting mirror through half the angle of pivoting of said frame about said first axis, and manually operable means carried by said bracket and pivotable to selectively move said frame and entrance reflector means about said first and second axes.

2. In a panoramic binocular telescope, right and left eyepieces mounted in fixed position, entrance reflector means, first means mounting said entrance reflector means for pivotal movement as a unit about a normally horizontal axis substantially in the plane of the reflector surface thereof, second means mounting said first means for pivotal movement about a normally vertical axis, right and left objectives carried by said second means below said entrance reflector means to receive rays reflected from said reflector means, and optical means to reflect an erect image of the field of view scanned by said entrance reflector means from each said objective to a respective eyepiece, said last-named means including a unitary reflector having oppositely disposed discrete reflecting surfaces, each said reflecting surface being in and forming a portion of the optical train from said entrance reflector means to a respective eyepiece.

3. A panoramic binocular telescope comprising a bracket having bearing means defining a normally vertical first axis, there being a slot in said bracket concentric of said axis, a frame, entrance reflector means journaled in said frame on a normally horizontal second axis coplanar with the plane reflector surface of said reflector means, right and left objectives carried by said frame to receive rays from said entrance reflector means, said frame being rotatably and slidably mounted in said slot, right and left eyepieces fixedly carried by said bracket, optical means to reflect rays from said objectives to said eyepieces, respectively, said optical means including right and left double prisms carried by said frame, said optical means also including a double crossed mirror, means mounting said mirror on said bracket for pivotal movement on said first axis, and connections between said frame and said last-named means for rotating said mirror on said first axis in response to sliding of said frame along said slot.

4. In a panoramic telescope, a bracket, a frame pivoted on said bracket on a normally vertical first axis, an entrance mirror pivoted in said frame on a normally horizontal second axis coplanar with said mirror, an objective carried by said frame to receive rays reflected from said mirror, a double prism on said frame to reflect rays from said objective horizontally rearwardly then laterally, in a first direction, a 90° reflector on said bracket to reflect rays from said prism first vertically then laterally in a second direction opposite to said first direction, an eyepiece on said bracket, means to rotate said reflector about a normally vertical axis through half the angle of rotation of said frame, and means reflecting the rays from said reflector to said eyepiece.

5. A telescope as recited in claim 4, a handle rotatable with said frame about said first axis and pivotable thereon about a normally horizontal axis, and means coupling said handle and mirror for rotating said mirror on rotation of said handle about its said horizontal axis.

6. A panoramic telescope comprising a bracket having bearing means defining a normally vertical first axis, a frame, a pair of entrance mirrors mounted in said frame for pivoting as a unit about a normally horizontal second axis in the common plane of said mirrors, right and left objectives mounted in said frame below said mirrors to receive rays from a respective mirror, right and left double reflectors each carried by said frame to reflect rays from a respective objective rearwardly then horizontally inwardly, a crossed mirror reflector, means mounting said crossed mirror reflector on said bracket for pivotal movement in said bearing means, said crossed mirror reflector receiving rays from said double reflectors and reflecting the same first vertically, then horizontally outwardly, right and left eyepieces carried by said bracket, means to reflect rays from said crossed mirror reflector to said eyepieces, said frame being pivotally mounted in said bracket on a normally vertical third axis concurrent with said second axis, and means connecting said frame and crossed mirror reflector to rotate the latter through half the angle of rotation of said frame relatively to said bracket.

7. In a panoramic telescope, a bracket having bearing means defining a first axis, a link pivoted at one end on said bearing means, a first shaft having an axial bore and pivoted in the other end of said link on a second axis parallel to said first axis, a frame fixed to said first shaft, an entrance reflector, a second shaft mounting said reflector in said frame for pivotal movement on a third axis normal to and concurrent with said second axis and parallel with the light-receiving surface of said reflector, an objective carried by said frame in position to receive rays reflected from said reflector, a handle pivoted on one end of said first shaft parallel with said third axis, a third shaft extending through said bore in said first shaft, and connections between said handle and said second shaft, including said third shaft, to rotate said entrance reflector in response to pivotal movement of said handle.

8. A telescope as recited in claim 7, an eyepiece fixed on said bracket, an optical train reflecting the rays from said objective to said eyepiece, said train including a crossed mirror connected for pivotal movement with said link about said first axis, and means for rotating said link on said first axis through half the angle of pivotal movement of said first shaft and frame about said second axis.

9. A telescope as recited in claim 8, said last-named means including first and second pulleys fixed to said first shaft and bracket, respectively, each having a diameter substantially equal to the separation of said first and second axes and being substantially coplanar, and belt means extending about said pulleys and connecting the same for equal and opposite rotation.

10. In a panoramic telescope, a fixed bracket, an eyepiece carried by said bracket, a first casing mounted on said bracket for pivotal movement about a normally vertical first axis and having a second normally horizontal axis, a second casing having a third axis, frame means rotatably connected with said casings and mounting said second casing for revolution about said second axis with said second and third axes parallel, means connecting said casings so that said second casing rotates on said third axis through twice the angle of revolution of said third axis and frame means about said second axis, an entrance reflector and an objective on said second casing, said reflector receiving entering rays normal to said third axis and reflecting the same along said third axis to said objective, a Porro prism carried by said frame means and reflecting rays from said objective along said second axis to a mirror carried by said first casing, means including a reflector having its reflecting surface in and pivoted on said first axis and reflecting rays from said mirror to said eyepiece for all positions of said casings about said first axis, and a connection between said frame means and said last-named reflector connecting the same for synchronous pivotal movement in 2:1 ratio about said first axis.

11. In a panoramic telescope, a bracket, an eyepiece fixed on said bracket, a first cylindrical casing having a normally horizontal first axis and pivoted on said bracket on a normally vertical second axis, a second cylindrical casing having a third axis, frame means mounted on said first casing for pivotal movement about said first axis, said second casing being pivoted on said frame means for rotation on said third axis parallel to said first axis, means connecting said casings whereby said second casing has pure rolling movement on and about said first casing, an entrance reflector and an objective carried by said second casing, a Porro prism on said frame means in position to reverse rays proceeding along said third axis from said entrance reflector and objective to and along said first axis, mirror means carried by said first casing to reflect rays from said Porro prism normal to said first axis, means reflecting rays from said mirror means to said eyepiece, and means rotating said mirror means through half the angle of rotation of said casings about said second axis.

12. A binocular panoramic telescope comprising, right and left fixed eyepieces, right and left entrance reflectors, first means mounting said entrance reflectors for movement as a unit about a normally horizontal axis, right and left objectives, each positioned to receive rays reflected from a respective entrance reflector, second means mounting said entrance reflectors and objectives for synchronous movement about a normally vertical axis, a pellicle having both sides specular, means mounting said pellicle for pivotal movement about a normally vertical axis in the plane of said pellicle, means including one specular side of said pellicle for reflecting rays from said left objective to said left eyepiece, means including the other specular surface of said pellicle for reflecting rays from said right objective to said right eyepiece, and means pivoting said pellicle about its said axis through one-half the angle of rotation of said second means about its own axis.

13. In a binocular panoramic telescope, right and left eyepieces having parallel principal axes, right and left entrance reflectors mounted for pivotal movement as a unit about a normally horizontal first axis and a second normally vertical second axis, right and left objectives each having its principal axis normally vertical and in superposed relation with a respective entrance reflector, first and second reflectors each positioned to receive the rays from a respective objective and to direct the same inwardly parallel with said first axis, third and fourth reflectors each positioned to reflect the rays from said first and second reflectors, respectively horizontally forwardly, fifth and sixth reflectors, a pellicle having both sides specular, said pellicle being pivoted on a normally vertical axis midway between the principal axes of said eyepieces, said fifth and sixth reflectors being positioned to reflect the rays from said third and fourth reflectors, respectively inwardly to respectively opposite specular surfaces of said pellicle, a pair of fixed reflectors reflecting the rays reflected by said pellicle into said eyepieces, respectively, and means rotating said pellicle about its axis through one-half the unitary rotation of said entrance reflectors, objectives and first to sixth reflectors, inclusive, about said second axis.

14. In a panoramic binocular telescope, an adjustably fixed bracket, right and left eyepieces fixedly carried by said bracket, a frame journaled on said bracket on a normally vertical axis, right and left objectives fixedly carried by said frame, right and left entrance reflectors, means carried by said frame and mounting said entrance reflectors for pivotal movement as a unit relatively to said frame about a normally horizontal axis and in spaced relation along said axis, to reflect rays from a remote field of view to respective ones of said objectives, optical means reflecting the rays from each said objective to a respective eyepiece, said optical means including a unitary reflecting element having oppositely disposed discrete reflecting surfaces, each said surface forming a part of the respective optical trains from an entrance reflector to the corresponding eyepiece, and a single means manually operable in two different directions respectively to pivot said frame relatively to said bracket and said entrance reflectors relatively to said frame.

15. In a panoramic binocular telescope, a bracket, right and left eyepieces fixedly carried by said bracket, a frame mounted on said bracket for pivotal movement about a normally vertical first-axis, right and left entrance reflectors, means mounting said entrance reflectors on said frame for pivotal movement as a unit about a normally horizontal second axis, right and left objectives each positioned in the path of rays reflected by a respective one of said entrance reflectors to receive rays therefrom, means reflecting the rays passing through each objective, to a respective one of said eyepieces, said means including a unitary reflector in common having reflecting surfaces on opposite sides thereof, each of said surfaces being a component part of the optical train from a respective entrance reflector to the corresponding eyepiece, and means coupling said frame and unitary reflector, for rotating the latter upon a normally vertical axis through one-half the angle of rotation of said frame about said first axis.

16. In a scanning telescope, a mounting bracket, a frame pivoted on said bracket for rotation about a normally vertical first axis and for revolution about a second axis parallel with said first axis, an entrance reflector pivoted on said frame on a normally horizontal third axis concurrent with said first axis and in the plane reflecting surface of said reflector, an objective lens fixedly mounted on said frame below said reflector to receive light rays therefrom, an eyepiece fixed on said bracket, a unitary mirror having discrete angularly-related confronting specular surfaces cooperating to reflect rays incident thereon through 180°, means mounting said mirror on said bracket for pivotal movement about said second axis at right angles to the normally horizontal line of intersection of said specular surfaces, reflectors carried by said frame and reflecting the rays from said objective to one said specular surface, other reflectors carried by said bracket and reflecting the rays from the other said specular surface into said eyepiece, means revolving said frame about said second axis through one-half the angle of rotation of said frame about said first axis, and means responsive to revolution only of said frame for synchronously rotating said unitary mirror through the same angle and in the same direction.

17. In a panoramic telescope, first and second generally cylindrical casings of equal effective diameter, a frame interconnecting said casing and mounting said second casing for revolution about said first casing in side-by-side contiguous relation therewith and with their axes in parallelism, means journaling said second casing in said frame for rotation about its own axis, means interconnecting said casings in rolling relation only, reflector means carried by said frame to reflect rays passing along the axis of said second casing, through 180°, into parallelism with and along the axis of said second casing, a bracket, an eyepiece fixed on said bracket, an entrance reflector carried by said second casing to reflect rays entering said second casing normal to the axis thereof, through 90° and along said second casing to said reflector means, a second reflector in said first casing to receive rays from said reflector means, means journaling said casings on said bracket for rotation as a unit about an axis perpendicular to the axes of said casings, and a third reflector journaled on said bracket on said perpendicular axis to reflect rays from said second reflector into said eyepiece.

18. In a panoramic telescope, a first casing having a cylindrical surface defining a normally horizontal first axis, means mounting said casing for pivotal movement about a normally vertical second axis perpendicular to said first axis, frame means journaled on said first casing for pivotal movement about said first axis, a second casing having a cylindrical surface defining a third axis, means journaling said second casing in said frame with said third axis parallel to said first axis, an entrance reflector carried by said second casing and adapted to reflect entering rays along said third axis, a double reflector fixed with said frame in position to reflect rays proceeding along said third axis through 180° to and along said first axis, and means connecting said cylindrical surfaces in rolling relation only in response to angular movement of said second casing and frame as a unit about said first axis.

19. In a panoramic binocular telescope, an adjustably fixed bracket, right and left eyepieces fixed with said bracket, a frame journaled on said bracket on a normally vertical axis, right and left objectives carried by said frame, right and left entrance reflectors, means carried by said frame and mounting said entrance reflectors for pivotal movement as a unit relatively to said frame about a normally horizontal axis and in spaced relation along said horizontal axis, to reflect rays from a remote field of view to respective ones of said objectives, a plane reflector pivoted on a vertical axis on said bracket and having specular surfaces on both sides thereof, and right and left optical trains each including a respective one of said surfaces, each said train acting to reflect rays passing a respective objective into a respective eyepiece, and means connecting said frame and plane reflector for synchronous rotation in 2:1 ratio.

ROGER HAYWARD.

REFERENCES CITED

The following references are of record in the file of this patent:

UNITED STATES PATENTS

| Number | Name | Date |
|---|---|---|
| 760,545 | Miller | May 24, 1904 |
| 784,852 | Goerz | Mar. 14, 1905 |
| 921,137 | Michaelson | May 11, 1909 |
| 1,107,503 | Eppenstein et al. | Aug. 18, 1914 |
| 1,501,059 | Metz | July 15, 1924 |
| 1,869,417 | Grunberg | Aug. 2, 1932 |
| 1,869,530 | Von Hofe et al. | Aug. 2, 1932 |
| 2,098,917 | Gunther | Nov. 9, 1937 |
| 2,184,615 | Gunther | Dec. 26, 1939 |
| 2,358,646 | Klemperer | Sept. 19, 1944 |

FOREIGN PATENTS

| Number | Country | Date |
|---|---|---|
| 26,791 | Great Britain | of 1911 |
| 12,445 | Great Britain | of 1915 |
| 342,843 | Germany | Oct. 24, 1921 |
| 714,054 | Germany | Nov. 24, 1941 |